United States Patent [19]
Rocker

[11] 4,146,096
[45] Mar. 27, 1979

[54] LAWN RAKE AND CULTIVATOR

[76] Inventor: Galen J. Rocker, 1728 S. 93rd St., Omaha, Nebr. 68124

[21] Appl. No.: 783,389

[22] Filed: Mar. 31, 1977

[51] Int. Cl.² .................... A01B 19/00; A01D 77/00
[52] U.S. Cl. ...................................... 172/643; 56/375
[58] Field of Search ............... 172/142, 250, 251, 252, 172/379, 622, 643, 707; 56/375, 376, 384, 395, 396, 400

[56] References Cited

U.S. PATENT DOCUMENTS

| 444,609 | 1/1891 | Hallock | 172/643 |
|---|---|---|---|
| 1,667,643 | 4/1928 | Waldmann | 172/643 |
| 2,953,830 | 9/1960 | MacRae | 56/400 X |
| 3,223,177 | 12/1965 | van der Lely | 172/707 X |
| 3,356,162 | 12/1967 | van der Lely | 172/643 |
| 3,362,480 | 1/1968 | Barber | 56/400 X |
| 3,765,159 | 10/1973 | Neff | 56/396 |

FOREIGN PATENT DOCUMENTS 90782 7/1961 Denmark ................................... 56/400

Primary Examiner—Richard T. Stouffer
Attorney, Agent, or Firm—Hiram A. Sturges

[57] ABSTRACT

A lawn rake and cultivator comprising a frame having multiple rows of depending tines, each of which has a forward end which inclines forwardly and upwardly the majority of the time during forward travel, for pitching thatch forwardly and upwardly out of grass due to resiliency of the teeth which causes them to move backwards and forwards as they engage the ground and support the frame, one or more teeth being held upwardly for row crop cultivation by passing harmlessly across the row crop, the teeth being stiffened for special uses by a horizontal stiffener fixed to the frame and having openings therethrough receiving center portions of the teeth.

7 Claims, 4 Drawing Figures

LAWN RAKE AND CULTIVATOR

BACKGROUND OF THE INVENTION

In the past it has been thought that it is necessary for a rake to rotate in order to lift thatch, such as grass cuttings and other debris from its position on the surface of the ground beneath a grass lawn.

The thatch is so firmly embedded in the grass and so thick and compact in most cases that an ordinary forward motion raking action with stiff rake time, such as used in a common garden rake, tends to damage the roots of the grass because of the stiffness of the tines. The common stiff hand rake, when pulled forwardly across the surface of the ground, only claws, and does not lift the thatch. The result is that such a rake just becomes clogged with thatch, and quickly needs to be manually cleaned, and this leads to tedious labor.

For this reason power rakes have become popular. Power rakes have a rotary motion and, therefore, have the possibility of lifting the thatch. However, the power rake also has the tendency to rip up the roots of the grass. Much destruction is caused. Rotating power rakes do not follow the terrain. Therefore, when they come to ground which is slightly higher the grass roots are more severely ripped out.

Such rotating power rakes require considerable skill on the part of the operator because the power rotation tends to propel the rake forwardly, and much attention needs to be given to hold the rack back and to guide it. This makes a very tiring operation if a lawn has much size.

Rotating power rakes for the lawn have appeared to be no more than an adaptation of rotating power rakes used for hay in farm work. The chief difference has only been in size of the units.

I am aware that a lawn thatch removal rake was proposed in U.S. Pat. No. 3,765,159 issued Oct. 16, 1973 to Dean O. Neff, and titled: "Thatch Removal Device." In the said patent the teeth are designed to dump clumps of thatch collected thereon rearwardly of each tooth as the pressure of the thatch built up against its forward side causes that tooth to spring upwardly and rearwardly sufficient to allow the clump of thatch to pass thereunder.

All of this is because the teeth in the patent to Neff U.S. Pat. No. 3,765,159 incline rearwardly at times when they are in rest position.

The tines of the said patent necessarily incline rearwardly from the vertical at times when they are in rest position. They also incline rearwardly from the vertical at all times since they cannot come forward beyond the vertical because the ground surface would prevent that.

It is an object of this invention to provide my new concept of having tines which incline forwardly of the vertical when in rest position and which are so mounted that they tend to dance back and forth and from side to side. My tines, on forward motion, tend to pitch the thatch forwardly and upwardly much like the tines of a pitchfork would. That way they surely lift the thatch out of the ground, and yet the speed of vibration is such that my tines are constantly self cleaning. They are almost immediately pitching thatch upward before they can become loaded to an extent that would render them non-functional because of a clump of thatch. The clumps of thatch simply do not form, because the forward and upward pitching is sufficiently rapid.

Another objective of this invention is to provide a tine so positioned in moving that it is always in good working order, never clogged by thatch.

Another object is to have the rake supported on multiple rows of tines so that it follows the level of the ground and does not tend to dig in excessively deep in places of gradually increasing ground height.

Self-cleaning of the tines is another objective and is accomplished by having multiple rows of tines so that clumps of thatch can be passed by without being hung up as they would be if all the teeth were in one single row of extremely closely spaced teeth.

A further object is to have the lowermost ends of the teeth of the multiple rows spaced gradually higher at the forward, and gradually lower at the rearward rows, so that the teeth in the forward rows which would naturally catch the most thatch do not do all the work by tending to lift the frame until the rearward rows are out of raking position. By having the rearward rows gradually lower, they will still be effective, and the forward rows will not do such a large proportional amount of the raking.

Disposing of the rows in this position is a function of the length of the tongue, the angle of attachment of the tongue to the rake frame and the height of the forward end of the tongue during towing.

An objective is to provide a rake capable of being towed by a common self-propelled riding lawnmower of modest size.

An important objective is that the teeth be designed to pitch the thatch upwardly and forwardly into good position for removal by a power lawnmower or a lawn broom.

The downward pressure of the rake is regulated by placing various weights thereon to deal with the conditions of whether the grass is wet of dry or the ground is moist or dry, or whether cultivation or raking is desired.

The cultivation of row crops is an objective and is achieved through the concept of holding some of the tines upwardly so as to permit part of the rake to not be in operation so that that part of the rake can be disposed over a row crop.

A further objective is to provide a tooth stiffening horizontal member having openings therethrough, each receiving a mid-section of a tooth, such a member being secured to the frame for stiffening the teeth for use during light tillage such as grass seeding or lawn reseeding. The peg board is not used during row crop cultivation, nor during ordinary use as a thatch rake.

In general, the new lawn rake and cultivator has four major functions: (1) Use as a lawn rake to remove thatch and debris; (2) For seed bed preparation for garden or grass seed; (3) To prepare a lawn by very light tillage, such as to over seed by preparing a shallow seed bed in a present lawn with the tines stiffened with the stiffener member, whereby seed is worked into a present lawn; and (4) Use as a garden cultivator.

SUMMARY OF THE INVENTION

A lawn rake and cultivator adapted to be towed behind a self-propelled vehicle and having a frame, multiple rows of teeth spaced apart with respect to each other, as seen from the side of the frame, said teeth in total being spaced apart with respect to each other, as seen in frontal elevation, the upper end of each tooth being attached to the frame by means of a spring for providing each tooth with a capacity for being pressed backward in an engagement with the ground, and thereafter to spring forwardly for pitching thatch up from the surface of the ground, each tooth having a lowermost portion which during the majority of the time during forward travel is disposed facing forwardly and upwardly for the pitching of thatch, the lowermost end portion of each tooth being inclined forwardly with respect to the shank of each tooth for facilitating thatch pitching is a list of major features.

Another important feature is a stiffener which is a horizontal member with vertical openings therethrough, each snugly receiving a mid-section of a different one of the tines, the stiffener being attached to the frame whereby the teeth are made more rigid for light tillage, such as for the seeding of lawns.

BRIEF DESCIPTION OF THE DRAWING

FIG. 1 is a side elevation of the lawn rake and cultivator of this invention, shown with a stiffener mounted thereon for making the teeth operate with greater rigidity, the tongue being shown in both full and dotted line positions to indicate its adjustability. Optional upwardly held positions of some of the tines are shown in dotted lines, and dotted lines also show tine upholding members in place for holding the tines upwardly.

Figure 4:
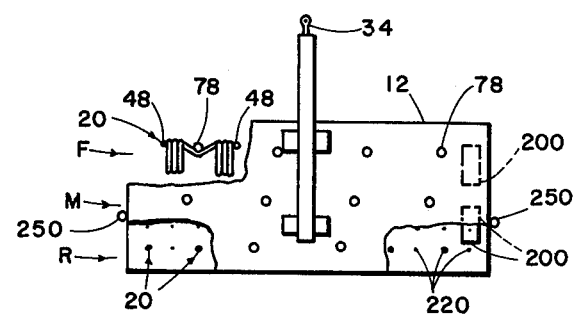

FIG. 4 is a diagrammatic composite view showing the rake and cultivator of this invention in top plan view, with a portion of the frame panel broken for showing a pair of teeth thereunder, with the springs therefor and also the bolt thereof showing, as accomplished by breaking away also a horizontal stiffener from the upper left corner adjacent the exposed pair of teeth and springs as shown. Right and left lower corners in the view as shown, having the horizontal frame member broken away, but also having all portions of the tines and their springs and mounting bolts broken away down to the level of the top of the horizontally extending stiffener or stiffener panel, whereby only the shank of teeth disposed therebeneath is revealed in cross section.

DESCRIPTION OF THE PREFERRED EMBODIMENT

Figure 1:
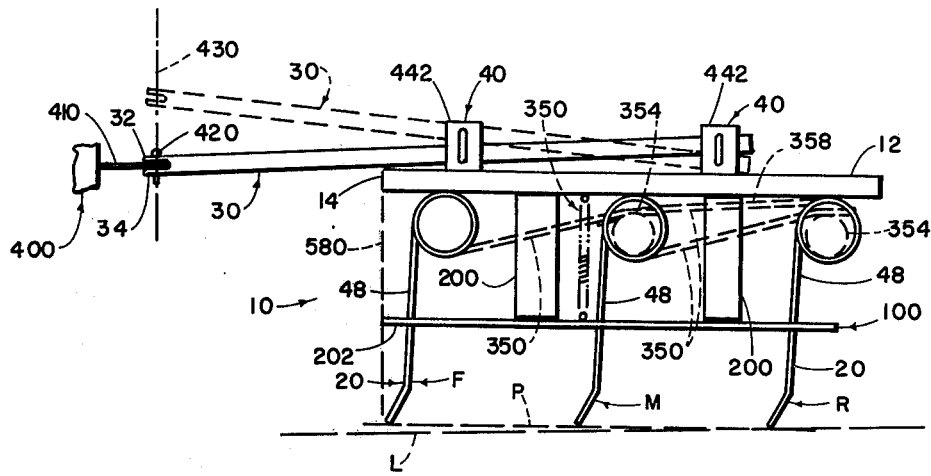

Referring to FIG. 1 the lawn rake and cultivator of this invention is generally indicated at 10, and will be seen to have a frame 12, which preferably is a single frame member extending horizontally and can be made of plywood, for example. The frame member 12 can be a rectangle in top plan view, having a leading edge 14 approximately 32 inches long for supporting a described sample number of tines, the latter being generally indicated at 20, suitable in number for being pulled behind a common lawn power mower of the riding type, self-powered and not shown, and to the rearward end of which a tongue 30 of this invention is attached to a hitch, not shown, by a suitable means, such as a hitch pin, not shown, dropped through openings in forward portions 32 of the tongue, or through an eye 34 fixed to the forward end of the tongue in a modification in FIG. 4.

The tongue 30 is elongated forwardly and rearwardly of the frame member 12 and extends across the middle of the forward side 14 and is attached to the upper side of the frame member 12 adjustably by means of a pair of bracket and bolt assemblies 40, which latter are spaced apart forwardly and rearwardly of each other, and are fixed to the upper side of the frame member 12, and are adapted to adjustably fix the tongue 30 therein so that the tongue can be fixed in a down slanted position, a horizontal position or an upwardly slanted position, the latter, for example, being shown in dotted lines in FIG. 1, all as is suitable to accommodate the position on the particular type of riding mower at which the hitch is disposed.

The teeth or tines 20 are twenty-four in total number in the example fitting for use behind an eight-horse power riding mower, as described, although this same number of teeth and arrangement described herein has also been used successfully behind a five-horse power riding mower otherwise as described.

The teeth or tines 20 are arranged so that their shanks 48 are disposed in three rows, a forward row opposite an arrow F in FIG. 4, a middle row opposite the arrow M in FIG. 4 and a rear row opposite the arrow R in FIG. 4.

Each of the rows F, M and R has eight tines 20 in it, and the tines in the forward row are offset with the tines in the middle row, and the tines 20 in the rearward row are also offset with the tines in the middle and forward rows, as best seen in top view in FIG. 4 with the explanation which now follows.

Figure 3:
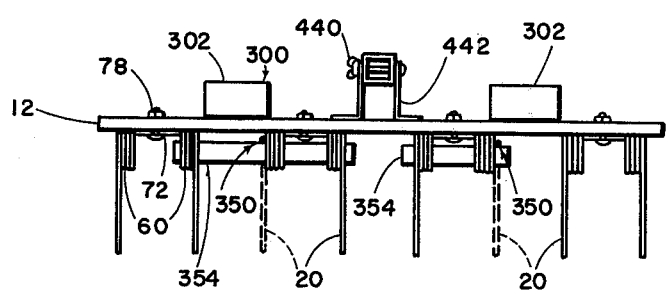
FIG. 3 is a frontal elevation of the rake and cultivator of this invention shown with two of its teeth held upwardly away from the ground, and in substantially horizontal positions, and shown with two teeth upholding members in place for holding the two teeth upwardly. The stiffener shown in FIG. 1 is not shown in FIG. 3, and the tongue is shown in a somewhat different position of adjustment.

Referring to FIGS. 3 and 4, each tine has a coiled spring portion 60 at its upper end and forming a part thereof. Each spring portion 60 has three full coils as seen in FIG. 3.

The outer forward end of each coil spring portion 60 is attached to the respective shank 48, and the inner end 72 of each coil portion is fixed to the frame.

Each coil spring portion 72 is formed of one integral piece of wire and the coiled springs of each pair of adjacent tines in a given row are formed of the same one piece of material which is integral piece of wire providing a vertical opening therethrough receiving a bolt and nut assembly 78, which latter attaches the portion 72 to the frame 12, so that a single bolt is capable of attaching two tines and their springs to the frame, as is to that extent conventional, although attachment to a horizontally extending handle is believed new.

With that understanding, FIG. 4 indicates the positions of four bolt and nut assemblies 78 in the row F, although except for the portions of FIG. 4 in which the frame panel 12 is broken away, the only parts of the bolt and nut assembly 78 showing is the nut and upper part of the bolt diagrammatically shown in FIG. 4, but shown in somewhat greater detail in FIG. 3 where the scale is larger.

Referring to FIG. 4 since each row F, M and R has in it four of the bolt and nut assemblies 78, it can be seen that immediately to the right and left of each bolt and nut assembly 78 there is a tine shank 48. A later described stiffener 100, seen in FIG. 1, is not always used and when it is not used the tines 20 have a maximum of flexibility and resilient springiness, as is very desirable during raking of thatch and cultivation of row crops as later described; and during such times and uses the way the teeth are mounted is very desirable for maximum use of the springs 60 to provide flexibility, since the springs are not tightly bound around a pipe, for example, at any time during operation.

Referring now to FIG. 4, it will be seen that each row F, M and R, therefore, is made up of sets of tines with two tines to a set, each tine of a set being those two tines which are coupled together and fixed by the same bolt and nut assembly 78. With that terminology it has been found adviseable to have each pair or set of tines in a given row F, M, or R spaced apart from the next pair of tines by a distance of four inches, whereby the bolt and nut assembly 78 in a given row F, M or R are spaced apart eight inches, and each tine in a given row is spaced apart with respect to the other tines in increments of four inches.

Figure 2:
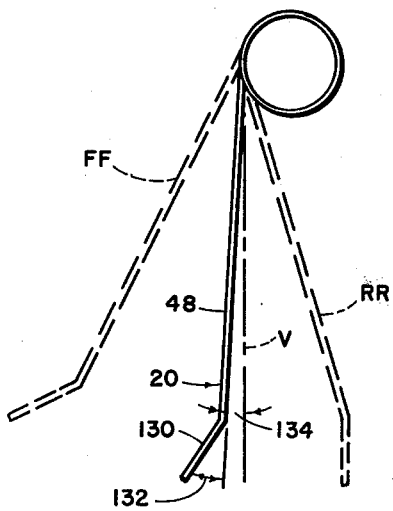
FIG. 2 is a diagrammatic side elevation of a single tooth and the spring thereof without showing its portions for attachment of the spring to the frame. Dotted lines in FIG. 2 indicate forward and rearward positions during travel of the spring resultant from engagement with thatch and ground surface.

The tines 20, as best seen in FIG. 2, are approximately eight inches in length from the lower tip thereof to the uppermost part of the spring thereof.

Each tine 20 has a straight shank portion 48 consuming the bulk of the vertical length of the tine, and has a forwardly inclined lower thatch pitching portion 130 which is preferably straight and formed of one piece of wire with the shank portion 48 and the spring portion 60 and likewise of one piece of wire with the spring portion 60 and tine of a mated tine of the same set or pair.

A forwardly inclined thatch pitching portion 130 is inclined forwardly at an angle 132 which is preferably twenty-five degrees.

It is preferred that the normal rest position of a tine be such that the shank 48 is inclined forwardly from the vertical at an angle of approximately eight degrees as shown at 134.

This position of the tine at rest seems to be ideal, because as the tine receives thatch on its forward side it will tend to bend back from rest position to a rearwardmost position such as indicated in dotted lines at RR in FIG. 2. Thereafter the tine will spring forwardly in a thatch pitching motion completely forwardly to the forward-most position FF, shown in dotted lines in FIG. 2, during which the thatch thereon will be pitched forwardly and upwardly out from the standing blades of grass surrounding the tine in a most beautiful fashion.

In the example being described herein each tine is preferably of a diameter of 3/16 inch and formed of spring steel wire.

The spacing between each row F, M and R from the next adjacent row is five inches in the example successfully tested.

No tine follows one in front of it, whereby if the entire rake were looked at from the forward side and all rows of teeth showing at once, then twenty-four teeth would appear with no two of them one behind another directly forwardly and rearwardly but, in fact, each off set from an adjacent tooth by an amount of approximately 1 5/16 inch.

In operation the tines swing freely, as in FIG. 2, and they not only constantly vibrate backward and forward for compression and release of the spring, and for gathering thatch and pitching thatch, but they also vibrate somewhat from side to side which is extremely useful because it allows a tine to work its way around a solid clump of grass roots, rather than tearing out a clump of grass roots.

Operation when the stiffener or stiffener member 100 is used in the horizontal position shown in FIG. 1, is accomplished first by passing the member 100 over the lower ends of the tines and upwardly into a position about 3½ or 4 inches from the bottom of the tines, as is easily regulated, because there are spacers 200 fixed to the top of a panel 202 which forms the main part of the stiffener, the panel 202 being normally horizontal and having a great quantity of vertical openings 220 therethrough, into some of which the tines 20 are passed.

Certain other ones of the openings 220 will be disposed directly beneath a position for a bolt and nut assembly 78, and so, of course, those openings would not have tines extending through them, and those openings are present in the stiffener panel portion 202, only because economy of manufacture is made possible by the use of material that is commonly called peg-board, and which has openings spaced apart each inch crosswise and lengthwise.

The spacers 200 are fixed to the panel 202 at their lower ends and their upper ends freely engage the underside of the frame panel 12. The stiffener panel 202 is drawn upwardly by spring assemblies 350, which attach the panel 202 detachably to the underside of the frame panel 12 by any suitable means. One spring assembly is seen in FIG. 1, and the same is shown on the left hand side of FIG. 4; whereas another spring assembly 250 can be seen on the right hand side of FIG. 4.

The spacers are two under the left hand side of the frame panel 12, as best seen in FIG. 1, and two under the right hand side of the panel 12, as best seen in dotted lines on the right hand side of FIG. 4.

After the stiffener 100 is put in place this has a tendency to lock all of the tines 20 together, eliminating most of the vibration thereof and changing the device of this invention into an implement for tilling soil to a depth of one inch or more and this is suitable for seeding new lawns.

Various amounts of weight can be placed on the panel 12, such as by putting a cement block or portions thereof thereon, so as to adapt the amount of penetration to the hardness of the ground and other soil conditions.

When the device of this invention 10 is used as a weeder or cultivator the teeth are used without the stiffener 100 and the frame 12 has a weight assembly 300 thereon which can comprise a pair of separate weighting units 302, seen in FIG. 3, so that the tines will penetrate the soil one inch or less. The vibrating action of the tines will cause sprouted weed seeds and roots to be brought to the surface where they will die. It is well known that weed seeds and roots will die when they are brought to the surface and this lawn rake and cultivator of this invention is excellent for accomplishing that result.

Referring now to FIGS. 1 and 3 it will be seen in FIG. 1 that certain ones of the tines 20 have been sprung upwardly into substantially horizontal positions, as shown in dotted lines at 350, and the same or other upwardly sprung tine in horizontal position can be seen at 350 in FIG. 3. The tines 350 are held upwardly by holders 354, which are elongated and adapted to extend through the springs 60 of which ever ones of the tines 20 that are disposed immediately rearward of a desired normal upper end of a tine which is to be upwardly bent so as to be out of the way, as is true for the first two rows of tines. However, tines which are to be swung upwardly and which are in the rearward row R, must be swung upwardly and forwardly so as to have a place for being upheld and one such rearward row of tines is designated by the numeral 358 in FIG. 1 because it is bent forwardly and upwardly.

All upwardly swung tines are held in place by the holders 354 which simply span through any two adjacent ones of the springs 60 which are adjacent and upwardly sprung tine and either forwardly or rearwardly thereof as the case may be and as described.

Referring to FIG. 3, it will be seen that wherever an upwardly swung tine is disposed there the rake can pass over row crop without destroying the latter, and still cultivation can be accomplished by the other teeth which remain down.

FIG. 3 is a diagrammatic view because to avoid complication only the forward row of tines is shown. It can be understood that multiple open spaces can be made so as to pass across multiple rows of crop which are close enough together to be passed over by the device 10 in a single movement across a field.

Referring to FIG. 1 a towing vehicle is there shown at 400 although most of the vehicle is broken away and it has a hitch portion 410 extending rearwardly therefrom and connected to the forward end of the tongue 30 by means of a vertical pin 420 so that the tongue 30 pivots with respect to the vehicle 400 about a vertical axis 430.

It is desirable that the tongue 30 be adjusted with respect to the frame 12 and set firmly in a position by means of wing bolts 40 adapted to be fixed in desirable positions with respect to slotted brackets 442 such that tines in the forward-most row F are disposed a greater distance upward with respect to level, the latter being indicated by the letter L in FIG. 1, than are the rearward-most tines in the row R, the tines in the forward row F, for example, being about one-half inch higher than the level of the tines in the rearward row R.

It is desirable that the tines, as a total group, have their lower ends disposed in a same plane, whereby the tines of the middle row M are disposed somewhat higher with respect to the level L than the tines of the rearward row R, but the tines of the middle row M are not disposed as high with respect to the level L as are the lower ends of the tines in the forward row F. The result of this position setting is that the forward tines in the row F will not then tend to take on by far the greater proportion of the raking load because they are disposed higher.

The plane on which the lower ends of all the tines rest can be seen at P in FIG. 1.

I have discovered that the length of the tongue has considerable importance, because if the tongue is too short, then upward and downward movements of the towing vehicle have an excessive effect on movements of the rake and cultivator 10. If the tongue extends forwardly from the frame a distance of approximately fourteen inches, then it works well. This is another way of saying that the forward end of the tongue attaches to the hitch of the vehicle towing approximately fourteen inches from the vertical plane, shown in dotted lines in FIG. 1 at 580, on which the lower-most ends of the tines 20 in the forward row F are disposed. I have found if this fourteen inches is reduced to eleven inches, then the operation of the rake is much less satisfactory and the left and right sides of the frame 12 will then move up and down with an increasing bouncing effect in a most unsatisfactory manner, causing the tines on the right and left sides of the center respectively to take turns in chopping downwardly into the earth.

It is important also that the connection between the forward end of the tongue 30 and the vehicle 400, as represented by its rearward-most part 410, be a connection that not only permits pivoting of the tongue 30 with respect to the vehicle 400 about a vertical axis seen in 430, but also about a horizontal axis, not shown, but which can be imagined as extending through the forward end of the tongue, all as is common to trailer hitches. In FIG. 1 this can be imagined as accomplished by a loose fit between the portions 32 and 34 of the tongue 30, and the member 410 of the towing vehicle, a very loose fit.

I claim:

1. A lawn raking machine for lifting thatch from grass and adapted to be moved across the surface of ground, said ground having blades of grass growing thereon and having thatch between said blades of grass, said blades and thatch defining ground and surface materials, said machine having a frame, a forward row of tines, at least one other row of tines disposed rearwardly of said forward row, said rows of tines being substantially spaced apart as seen from a side of said frame, said tines extending downwardly from said frame, means attaching each of said tines to said frame, each said tine and its said attaching means comprising a tine and attaching assembly, the arrangement of said tines and said attaching means permitting said tines, when in operation, to swing sufficiently freely to gather and pitch thatch while at the same time permitting said tines to vibrate from side to side sufficiently to permit each tine to work its way around a solid clump of grass which it encounters rather than tearing out the same so as to permit said tines to be substantially free from grass root destruction, each tine having a rest position when out of contact with the surface of the ground, the lower end of each tine defining an oscillation forwardly and rearwardly with respect to said frame during thatch raking, each tine having a thatch-pitching portion adjacent the lower end thereof which is in engagement with thatch during lawn raking of thatch, said machine providing an amount of force pressing said tines downwardly and said tines being of sufficient effect in upholding said frame and said tines having amounts of effective length and stiffness and resiliency and flexibility and the positions of the tips of said tines when said tines are in said rest positions being such as to cause said tines to define said oscillation during forward movement of said machine as a result of engagement with said ground and surface materials when said ground is of a softness in a range suitable for raising grass and being such as to cause the forwardmost surfaces of said thatch-pitching portions to be facing upwardly at least to a substantial extent during the majority of said oscillation whereby thatch gathered on said tines durig raking from an area in which thatch is closely adjacent the top of the ground will be pitched upwardly to a substantial extent by said thatch-pitching portions.

2. The lawn raking machine of claim 1 having a stiffener, said stiffener having a plurality of openings therethrough receiving said tines whereby the walls of said openings substantially snugly fit said tines, said stiffener having sufficient rigidity as to tend to bind said tines together somewhat so as to greatly reduce the resiliency of said tines, said stiffener having means thereon for removably securing said stiffener to said frame in a manner for maintaining said stiffener in said position, said stiffener openings each receiving a portion of said tine disposed intermediate the ends of a downwardly extending portion of said tine and receiving a part of said respectively tine that would be freely flexible if the stiffener were absent, said stiffener being disposed in engagement with said frame independently of said tines, said stiffener receiving and stiffening the tines in a plurality of said rows of tines, whereby the stiffening effect of said stiffener on any one tine comes partly from its engagement with other tines and partly from its being secured to said frame.

3. The lawn rake machine of claim 1 having a certain tine, there being at least two other reference tines disposed closer to and farther from the center of said frame respectively than said certain time, a holding means fixed to said rake and holding said certain tine upwardly toward said frame so that its lower end will not strike the ground during a period of operation, said holding means and frame being so characterized that during said period of operation said reference tines will touch the ground.

4. A lawn raking machine for lifting thatch from grass and adapted to be moved across the surface of ground, said ground having blades of grass growing thereon and having thatch between said blades of grass, said blades and thatch defining ground and surface materials, said machine having a frame, a forward row of tines, at least one other row of tines disposed rearwardly of said forward row, said rows of tines being substantially spaced apart as seen from a side of said frame, said tines extending downwardly from said frame, means attaching each of said tines to said frame, each said tine and its said attaching means comprising a tine and attaching assembly, the arrangement of said tines and said attaching means permitting said tines, when in operation, to swing sufficiently freely to gather and pitch thatch while at the same time permitting said tines to vibrate from side to side sufficiently to permit each tine to work its way around a solid clump of grass which it encounters rather than tearing out the same so as to permit said tines to be substantially free from grass root destruction, each tine having a rest position when out of contact with the surface of the ground, the lower end of each tine defining an oscillation forwardly and rearwardly with respect to said frame during thatch raking, each tine having a thatch-pitching portion adjacent the lower end thereof which is in engagement with thatch during lawn raking of thatch, at least the majority of said tines in each of said rows having a coiled spring portion forming an upper part thereof and having a portion extending downwardly from said coiled spring portion to the lower tip of the respective tine, said coiled spring portions each having a plurality of full loops, said machine providing an amount of force pressing said tines downwardly and said tines being of sufficient number and size and of such a material for a sufficient effect in upholding said frame and said tines having amounts of effective length and stiffness and resiliency and flexibility and the positions of the tips of said tines when said tines are in said rest positions being such as to cause said tines to define said oscillation during forward movement of said machine as a result of engagement with said ground and surface materials when said ground is of a softness in a range suitable for raising grass and being such as to cause said thatch-pitching portions to be facing upwardly at least to a substantial extent during the majority of said oscillation whereby thatch gathered on said tines during raking from an area in which thatch is closely adjacent the top of the ground will be pitched upwardly to a substantial extent by said thatch-pitching portions and being such that during raking operation the tips of the lower ends of the majority of said tines are each oscillating in such a swath that the majority of the time during such raking operation each said tip is disposed forwardly of a line extending vertically downward from a forward side of the spring of the respective tine for effective forward pitching of the thatch, when said tines are in said rest positions the majority of said lower tips of said tines each being a substantial distance forwardly of the forwardmost part of the respective coiled portion thereof.

5. The lawn raking machine of claim 4 having said tips when in said rest positions being at least 6° forward of said vertical line.

6. The lawn raking machine of claim 1 having said tines each having its thatch-pitching portion inclining forwardly with respect to portions of the tine disposed immediately above its thatch pitching portion.

7. The lawn raking machine of claim 4 having said tines each having its thatch-pitching portion inclining forwardly with respect to portions of the tine disposed immediately above its thatch pitching portion.

* * * * *